US007444272B2

(12) United States Patent
Alvarez et al.

(10) Patent No.: US 7,444,272 B2
(45) Date of Patent: Oct. 28, 2008

(54) SELF-MODULATION IN A MODEL-BASED AUTOMATED MANAGEMENT FRAMEWORK

(75) Inventors: Guillermo A. Alvarez, San Jose, CA (US); Linda M. Duyanovich, Saratoga, CA (US); John D. Palmer, San Jose, CA (US); Sandeep M. Uttamchandani, San Jose, CA (US); Li Yin, Albany, CA (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 11/250,066

(22) Filed: Oct. 13, 2005

(65) Prior Publication Data
US 2007/0088532 A1    Apr. 19, 2007

(51) Int. Cl.
G06F 17/10 (2006.01)
G06E 1/00 (2006.01)
(52) U.S. Cl. ................................. 703/2; 706/21; 706/47
(58) Field of Classification Search ..................... 703/2; 706/21, 47
See application file for complete search history.

(56) References Cited

U.S. PATENT DOCUMENTS

| | | | |
|---|---|---|---|
| 6,233,499 B1 | 5/2001 | Glitho et al. | |
| 6,453,308 B1 | 9/2002 | Zhao et al. | |
| 6,587,744 B1 | 7/2003 | Stoddard et al. | |
| 6,665,651 B2 | 12/2003 | Young et al. | |
| 6,691,067 B1 | 2/2004 | Ding et al. | |
| 2002/0007389 A1 | 1/2002 | Jones et al. | |
| 2002/0032495 A1 | 3/2002 | Ozaki | |
| 2002/0111758 A1 | 8/2002 | Wang et al. | |

OTHER PUBLICATIONS

Cox, "Re-Discovering What You Do, a Data Mining and Rule Discovery Approach to Business Forecasting With Adaptive, Genetically-Tuned Fuzzy Systems Models," PCAI Magazine, vol. 13, Issue 5, pp. 1-7, 1999.
"Dynamic Monitoring of System Parameters," Research Disclosure, 431164, Mar. 2000, 1 page.

*Primary Examiner*—Russell Frejd
(74) *Attorney, Agent, or Firm*—Gibb & Rahman, LLC

(57) ABSTRACT

Embodiments herein present a method, system, computer program product, etc. for automated management using a hybrid of prediction models and feedback-based systems. The method begins by calculating confidence values of models. Next, the method selects a first model based on the confidence values and processes the first model through a constraint solver to produce first workload throttling values. Following this, workloads are repeatedly processed through a feedback-based execution engine, wherein the feedback-based execution engine is controlled by the first workload throttling values. The first workload throttling values are applied incrementally to the feedback-based execution engine, during repetitions of the processing of the workloads, with a step-size that is proportional to the confidence values. The processing of the workloads is repeated until an objective function is maximized, wherein the objective function specifies performance goals of the workloads.

20 Claims, 7 Drawing Sheets

(a) Function *I*

Function *T*

SELF-MODULATION IN A MODEL-BASED AUTOMATED MANAGEMENT FRAMEWORK

BACKGROUND OF THE INVENTION

1. Field of the Invention

Embodiments herein present a method, system, computer program product, etc. for self-modulation in the selection and execution of corrective actions in a model-based automated management framework.

2. Description of the Related Art

Within this application several publications are referenced by arabic numerals within brackets. Full citations for these publications may be found at the end of the specification immediately preceding the claims. The disclosures of all these publications in their entireties are hereby expressly incorporated by reference into the present application for the purposes of indicating the background of the present invention and illustrating the state of the art.

There are several techniques for automated system management—the existing taxonomy consists of rule-based, feedback-based, and model-based approaches. Each of these techniques has its advantages and disadvantages (as described below). The models used for predicting behavior are not always accurate, leading to selection and execution of incorrect actions, eventually leading to undesirable system behavior.

The popular approaches for system management are rule-based. These approaches have not become popular for real-world management scenarios, primarily because of the complexity involved in writing rules and the brittleness of the rules with respect to the underlying physical configuration. The alternatives to rule-based system management can be categorized into: Feedback-based systems and Model-based systems. Feedback-based systems rely on iteratively adjusting the values by observing the state of the system; provided that a tuning problem is amenable to the use of feedback and that the optimal knob settings can be reached in a reasonable amount of time, feedback-based tuning methods have the advantage of being able to adapt easily to changes in the environment. Further, such methods are able to perform well without any training (and thus can handle previously unseen workloads). On the other hand, Model-based systems create predictions for the behavior of the system for different workload characteristics, and configuration parameters; they can be used to distinguish between the global optimal state from the local optimas. But both feedback-based and model-based have limitations that have limited their use in real-world system management applications. These limitations are enumerated as follows:

For feedback-systems, it is often difficult to use feedback to tune multiple knobs simultaneously. With a single knob, the tuner only needs to decide whether to increase or decrease the current knob setting, whereas adjustments to multiple knobs require an understanding of how the knobs interact and how they jointly affect the performance of the system. Moreover, a large number of knob adjustments may be needed before the optimal knob settings are reached, and this may lead to unreasonable runtime costs for the tuner (which may not also be feasible in real systems). Further, it is difficult to apply feedback mechanisms to tuning problems whose performance metrics do not have obvious critical values. For example, if attempting to maximize the throughput of a database system, the critical (i.e., maximal) throughput value is not known ahead of time, and the impact of the knobs on throughput may be complicated. Finally, some knobs may be expensive enough to adjust that it would be impractical to iteratively adjust them in a search for the optimal settings, even if only a small number of adjustments are needed.

For model-based systems, they typically require an initial expenditure of time to train the model; in such cases, the model's predictions are not accurate until sufficient training data has been collected. In addition, it can be difficult to devise an accurate performance model for a complex software system. As the number of variables relevant to the tuning problem increases and, in particular, as tuning of an increasing number of interacting knobs is attempted, the challenge of developing an accurate model also increases.

In regards to feedback systems, Weikum et al. use a feedback-driven approach to tune a database systems multiprogramming level (MPL), a knob that limits the number of concurrent accesses to the database. They base the adjustments to this knob on a measure of lock contention in the system: when this metric exceeds a critical value, the MPL is reduced, and when it drops below the critical value, the MPL is increased. The authors determined the critical value experimentally, and they claim that it does not need to be fine-tuned; rather, they present the results of experiments demonstrating that there is a range of critical values that perform well on a wide range of workloads. The authors also present results showing that their approach allows the system to provide acceptable response times under extremely high loads.

Kurt Brown et al. use mechanisms based on feedback to tune knobs related to memory management and load control in a database system. The objective of the tuning is to meet the response-time goals of individual workload classes in a multiclass database workload, and the knobs are adjusted until either these goals are met or until the tuner determines that they cannot be met. The workload classes are tuned separately, and heuristics are used to address interdependencies between classes. Depending on the nature of a given class's memory usage, either one or two knobs are adjusted, and estimates and heuristics are used to guide the adjustments. Simulations used to validate the author's proposed mechanisms show that both the one-knob and two-knob timers are able to meet the goals of a variety of workloads, although the authors acknowledge that it can take a long time to achieve the response-time goals of certain types of workloads. The model-based approach presented, on the other hand, is able to avoid the potentially lengthy series of iterative adjustments that a feedback-based approach may require.

Microsoft's SQL Server employs feedback-based tuning to adjust the size of its cache of database pages. The adjustments are based on the amount of free physical memory in the system: when the number of free memory pages drops below one threshold, the size of the database cache is reduced; when the number of free pages exceed a second threshold, the cache size is increased. The authors of the paper that mentions this use of feedback-based tuning do not explain how the threshold values are chosen. The authors also outline plans to use feedback to adjust the number of pages read into the cache when the system performs read-ahead (i.e., when it proactively reads in pages that it anticipates will be accessed soon).

In the SEDA framework for highly concurrent Internet applications, applications consist of a series of components called stages that are connected by queues of events, and feedback-driven tuners called resource controllers are used to dynamically adjust each stage's resource usage. For example, a stage's thread pool controller tunes the number of threads associated with the stage, adding a thread when the length of the stage queue rises above some threshold and removing a thread when it sits idle for longer than a second threshold, SEDA's resource controllers operate at the application level, without needing to he aware of the resource management policies of the underlying operating system. It is unclear how sensitive these controllers are to the thresholds used to guide the knob adjustments, but the authors present results that demonstrate the ability of the resource controllers to effectively adapt to increasing load.

Feedback mechanisms have also been widely applied to resource management problems in operating systems, including CPU scheduling and network congestion and how control. To facilitate the use of feedback-based tuners in this domain, Goel et al. have developed a toolkit of simple, modular feedback components that can be combined and reused. However, all of their example tuners adjust a single knob, and it is unclear whether their components can effectively handle software-tuning problems that involve the simultaneous adjustment of multiple knobs.

More generally, almost all of the examples presented in this section involve tuning individual knobs in isolation. The one exception is the work of Brown et al., who tone two knobs simultaneously for one class of workloads. However, Brown himself explicitly mentions the difficulty of developing a feedback-based tuner that controls more than one knob, amid he is forced to conduct extensive experimentation to devise the heuristics that his tuner uses to adjust two knobs its concert.

Although feedback-based methods can, in theory, avoid the need for training and model building required by model-based methods, the examples presented above demonstrate that experimentation and the development of heuristics are often required to construct an effective feedback-based tuner. Even the examples that do not mention the need for this type of preliminary work would need some means of determining the threshold values that guide the tuner's knob adjustments.

In regards to prediction models, Brewer uses regression models to tune library subroutines. He employs linear regression but allows the independent variables to be nonlinear (e.g., an independent variable can represent time product of two or more of the parameters of the subroutine being optimized). Although this approach works well for tuning subroutines, it is unclear whether it would be possible to produce accurate regression-based performance models of large-scale software systems.

Matthews et al. use a model-based approach to tune a modified version of the log-structured file system (LFS). For example, they enable LFS to dynamically choose the better of two methods for performing garbage collection on the log that the system maintains on disk. Their models consist of simple formulas for estimating the cost or cost-benefit ratio of the possible knob settings; they are based on an understanding of the operations performed by the system and their associated costs. The models only parameters are measurements of the costs of various operations on a particular disk. The authors assess the effectiveness of their approach through simulations of both LFS and the disk on which it resides. It is unclear how well such simple models would work on an actual system, or whether it would even be possible to predict the performance of more complex systems using such models.

In a relational database system, indices and materialized views are supplemental data structures that can be created in an attempt to speed up frequently occurring database queries. The AutoAdmin project has developed model-based techniques for automating the selection of which indices and materialized views to create. The authors use the cost estimates of time database system's query optimizer as time model, and they develop novel methods for selecting which indices and materialized views to consider and for efficiently searching through the space of possible combinations of indices and materialized views. The internal models of time query optimizer are not discussed, and thus it would he difficult to transfer their approach to an arbitrary software system.

In the Odyssey platform for remote computing, applications adapt to changes in resource availability and user goals by varying the fidelity with which they operate (e.g., the frame rate used by a streaming video application). Narayanan et al. augment Odyssey with a system that uses models to predict an applications resource usage as a function of the relevant input parameters and fidelity metrics, and to thereby recommend appropriate fidelity levels for a given operation. To avoid annoying the user, the initial training data is collected during a special offline mode in which a given operation is repeatedly run using randomly chosen fidelities and inputs, and the parameters of the models are refined as the system runs. For their initial prototype, Narayanan et al. employ linear regression to derive the models, and they use linear gradient descent to update the models coefficients over time. To determine the appropriate fidelities for a given set of inputs, the tuning system employs a gradient-descent solver.

Menasc et al. use a tuner based on queueing network models to optimize time quality of service (QoS) of an e-commerce site. When their system detects that a QoS guarantee has been violated, it employs a hill-climbing search guided by the models predictions to find the knob settings that yield the locally maximal QoS. The authors present results showing that their tuner, which adjusts four knobs, is able to maintain reasonable QoS values in the face of increasing load. However, although queueing network models work well in this domain in which the knobs being tuned are directly connected to queues of requests waiting to be processed by a Web server and an application server it is unclear whether they could form the basis of a general software tuning methodology.

Vuduc et al., after discussing how empirical comparisons can be used to determine the optimal implementation of a library subroutine for a given platform, note that the best implementation may depend on the input parameters. Therefore, they propose taking a set of several good implementations (possibly found using empirical comparisons) and using models derived from training data to determine which of these implementations is best for a given set of inputs. They experimentally compare the ability of three types of models including the regression models proposed by Brewer amid a statistical classification algorithm known as time support vector method to choose between three candidate algorithms for matrix multiplication. The latter method has the best performance of the three, but it is unclear how well it would scale to tuning problems with more than one knob or, more generally, to problems with larger numbers of possible knob settings.

SUMMARY OF THE INVENTION

Embodiments herein present a method, system, computer program product, etc. for self-modulation in a model-based automated management system. Generally, a management framework consists of models that are acquired from different sources namely: policies supplied by the system-designer, regression-based models created by observing the system's behavior while in production mode, best-practices repository. The method calculates confidence values of models and maintains the confidence values as a weighted moving average based on a history of differences between predicted and observed values of the models.

Next, the method selects a model based on the confidence values and processes the model through a constraint solver to produce workload throttling values. The enforcement of the throttling values is not single-step, but rather incrementally using a feedback-based execution engine, wherein the increment size of the feedback-based execution engine is controlled by the confidence-value of the models The processing of the feedback-loop is repeated until an objective function is maximized, wherein the objective function specifies performance goals of the workloads.

Additionally, after every n iterations of the feedback loop, the method checks for divergent system behavior i.e. whether the impact of the action is converging the system to a desired system state; it decides to re-trigger the constraint solver to account for the unexpected changes in the system state that might occur during action execution.

Finally, based on the difference between the predicted and observed values of the model, the method calculates a safety margin to be associated with the models. This value is useful for the constraint solver, next time when the model is used—the solver calculates the action impact by appending the safety margin to the model predictions. The safety margin serves to immediately reflect changes in the system—especially useful since the process of refining models is slow.

The following disclosure uses workload throttling as an example embodiment of the invention. The model predictions have errors mainly because: 1) lack of monitored data for regions in the behavior space (i.e. a operating point that the system has not seen in the past); 2) even with exhaustive monitored data, the best-fit function derived by regression does have approximation errors as it does not go through all the data-points; and 3) changes in the function being modeled. The confidence values of the prediction models are based on the expected accuracy of the prediction for a given point in the behavior space.

Accordingly, embodiments of the invention present-techniques for dynamically modulating the working of the system based on the accuracy of the model predictions. More specifically, models are used to characterize the system properties, namely the workload characteristics and the component behaviors. At run-time, the models with the highest accuracy for the current operating point is selected, and fed to constraint solving that derives the workloads to be throttled. The output of constraint solving is the throttling values for each of the workloads; the accuracy of these values depends on the accuracy of the component and workload models. The confidence values of the prediction models are based on the expected accuracy of the prediction for a given point in the behavior space. Throttling values are not enforced in a single step, but are rather enforced incrementally as a feedback-based system. The step-size for the incremental feedback is proportional to the confidence values associated with the prediction models. It should he noted that the incremental throttle values for each workload are based on those generated by the constraint-solver. Further, the feedback loop continuously checks for divergent system behavior, and has the ability to trigger the constraint solver to re-calculate the throttling values. Finally, the difference between the observed and predicted value of the model is used as a safety margin for the next time a similar system state occurs.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
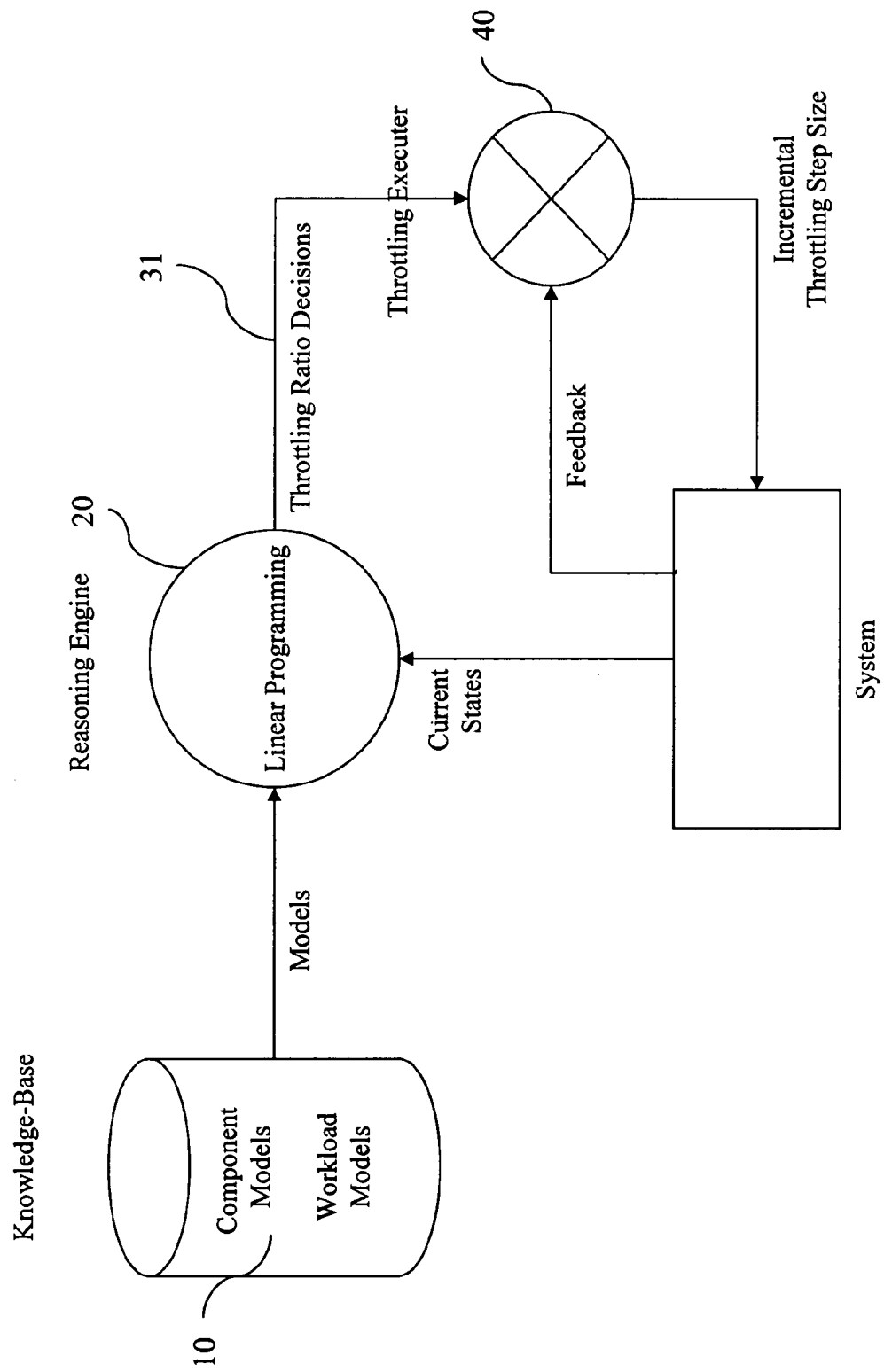
FIG. 1 is a schematic diagram of a system of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

Embodiments of the invention present techniques for dynamically modulating the working of the system based on the accuracy of the model predictions. More specifically, prediction models are used to characterize the system properties, namely the workload characteristics and the component behaviors. At run-time, workloads to be throttled are derived by constraint solving; this involves defining objective functions and constraints. The output of constraint solving is the throttling values for each of the workloads; the accuracy of these values depends on the accuracy of the component and workload models. The confidence values of the prediction models are based on the expected accuracy of the prediction for a given point in the behavior space. Throttling values are not enforced in a single step, but are rather enforced incrementally as a feedback-based system. The step-size for the incremental feedback is proportional to the confidence values associated with the prediction models. It should he noted that the incremental throttle values for each workload are based on those generated by the constraint-solver.

More specifically, embodiments of the invention provide an approach for system management that uses a combination of prediction models and feedback-based systems. As shown in FIG. 1, embodiments herein present a system generally comprising one or more models 10, constraint solver 20, first workload throttling values 31, and feedback-based execution engine 40. More specifically, first model 12 is selected from models 10 based on confidence values of the models, wherein first model 12 is processed through constraint solver 20 to produce first workload throttling values 31. Feedback-based execution engine 40 is controlled by first workload throttling values 31 and is utilized for repeatedly processing workloads. Specifically, first workload throttling values 31 are applied incrementally to feedback-based execution engine 40, during repetitions of the processing of the workloads, with a step-size that is proportional to the confidence values. The processing of the workloads is repeated until an objective function is maximized, wherein the objective function specifies performance goals of the workloads.

Additionally, second model 14 may be selected from models 10 (based on the confidence values) and processed through constraint solver 20 to produce second workload throttling values 32. Second workload throttling values 32 control the feedback-based execution engine and are applied incrementally to feedback-based execution engine 40 during repetitions of the processing of the workloads. The processing of the workloads is repeated until the objective function is maximized. The system further comprises safety margin 50 associated to models 10 for improved accuracy of the constraint solver 20 values in the future iterations, wherein safety margin 50 is based on the difference between predicted and observed values of models 10.

Embodiments of the invention can be described as follows: first, the prediction models (also referred to herein as models 10) are used to characterize the system properties, namely the workload characteristics, component behaviors, and action properties. This characterization is done by collecting datapoints from a running system and using regression to find the best-fit function through these points. Workload models are represented in terms of the request-rate at the components (in the invocation path), as a function of the application request-rate. Similarly, the component models are represented as the average response to service the requests as a function of the nature of the requests. Action models characterize the cost-benefit of invoking the action in the current system state.

Second, at run-time, the workloads to be throttled are derived by the constraint-solver (also referred to herein as constraint solver 20). This involves defining objective functions (which in this case are the workload SLAs) and constraints (which are the models of workloads and components). The output of constraint solving is the throttling values for each of the workloads (also referred to herein as workload throttling values 30); the accuracy of these values depends on the accuracy of the component and workload models (i.e., models 10). The predictions of workload and component models have errors mainly because: 1) Lack of monitored data for a few regions in the behavior space (i.e. a operating point that the system has not seen in the past); 2) The best-fit function derived by linear regression does has approximation errors as it does not go through all the data-points; 3) Changes in the function being modeled. The confidence values of the prediction models are based on the expected accuracy of the prediction for a given point in the behavior space.

Third, the output of the constraint solving is the per-workload throttling values (i.e., workload throttling values 30). These throttle values are not enforced in a single step, but are rather enforced incrementally by a feedback executor (also referred to herein as feedback-based execution engine 40). The feedback-loop is variably aggressive such that the step-size for the incremental feedback is proportional to the confidence values associated with the prediction models. It should he noted that the incremental throttle values for each workload are based on those generated by the constraint-solver. For example, the constraint solver generates throttle values for $W_1=40\%$, $W_2=30\%$, $W_3=0$; assume the incremental step-size=20%, the feedback executor will throttle values starting with $W_1=8\%$ and $W_2=6\%$. This is different from the conventional feedback system that would try all the possible directions in the behavior space (i.e. all the possible permutations of throttle values for the workloads). In other words, the conventional feedback system tries to find the optimal operating point by trying all the permutations of throttle values; the direction of the vectors is known, only the exact length is discovered using a feedback loop.

Embodiments of the invention generally comprise: prediction models and constraint solving; confidence values associated with the models; a feedback-based throttling executor; and a safety-margin calculator. More specifically, models 10 comprise component models, which characterize the behavior of each of the components, i.e. the expected response time, given the component's load characteristics.

Component_Response_Time$_{average}$=R(current load characteristics)

The response time is a summation of service time and wait time. As such, the function R is a composition of two functions $f$ and g where: $f$ defines the service time of the component given the load characteristics (e.g. the response time to service 16K IO requests with a read/write ratio of 0.5, and 32 outstanding IOs); and g defines the wait-time of the workload request due to interleaving of multiple workload streams arriving at the component. There are different approaches to represent g (as more fully described below).

Function $f$ is initially generated by running the calibration tests on the components. These tests generate IO requests with different permutation of <request_size, read_write_size, random_sequential_ratio, num_threads>. For each of the IO permutations, embodiments of the invention collect the iops, wait-time, and service-time counters from the component. The linear regression algorithm is used to generate the function:

Service_time (D)=$f$(request_size, read_write_ratio, random_sequential_ratio, request_rate)

Function g deals with the effect on the response time as a result of interleaving of multiple workload streams arriving at the component. One approach to represent interleaving is to use a multi-class queueing network model with each workload stream represented as separate class. The utilization U of the component is represented as:

$$\text{Utilization}(U) = \sum_{i=1}^{n} \lambda_{Wi} D_{Wi}$$

where $\lambda_{Wp}$ is the arrival rate and $D_{Wp}$ is the service-time for the workload stream Wp. As a result of interleaving, the requests generated workload Wp will be interleaved with requests from other workload streams. Hence the resultant response time of the component for the workload stream Wp is represented as:

$$\text{Resultant\_Response\_time}_{Wp} = \frac{D_W}{1-U}$$

This formulation assumes that all the workload streams are always ON. The effects of ON-OFF phasing and correlation between streams can be accounted using the concept of short-term utilization.

Models 10 further comprise workload models, which characterize the change in the request-rate at the components (in its invocation-path) as a function I of throttling the workload stream.

Request_rate$_{component}$=R(current_request_rate$_{worklod}$, percentage_throttling)

Figure 2:
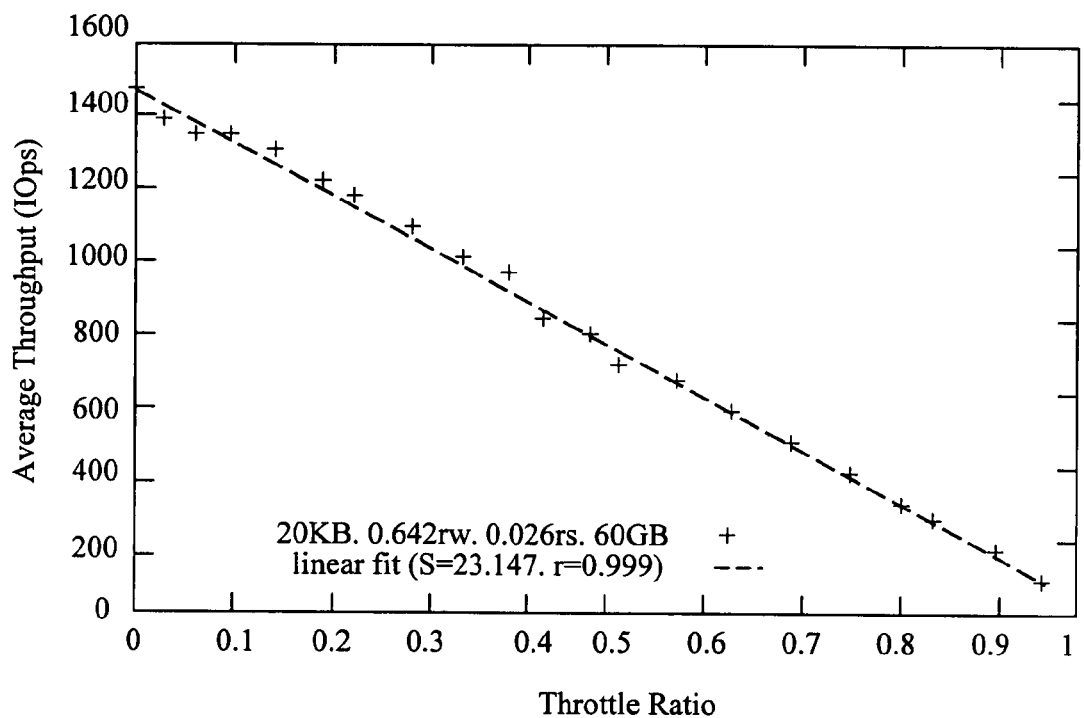
FIG. 2 illustrates workload model function graphs.
Figure 2:
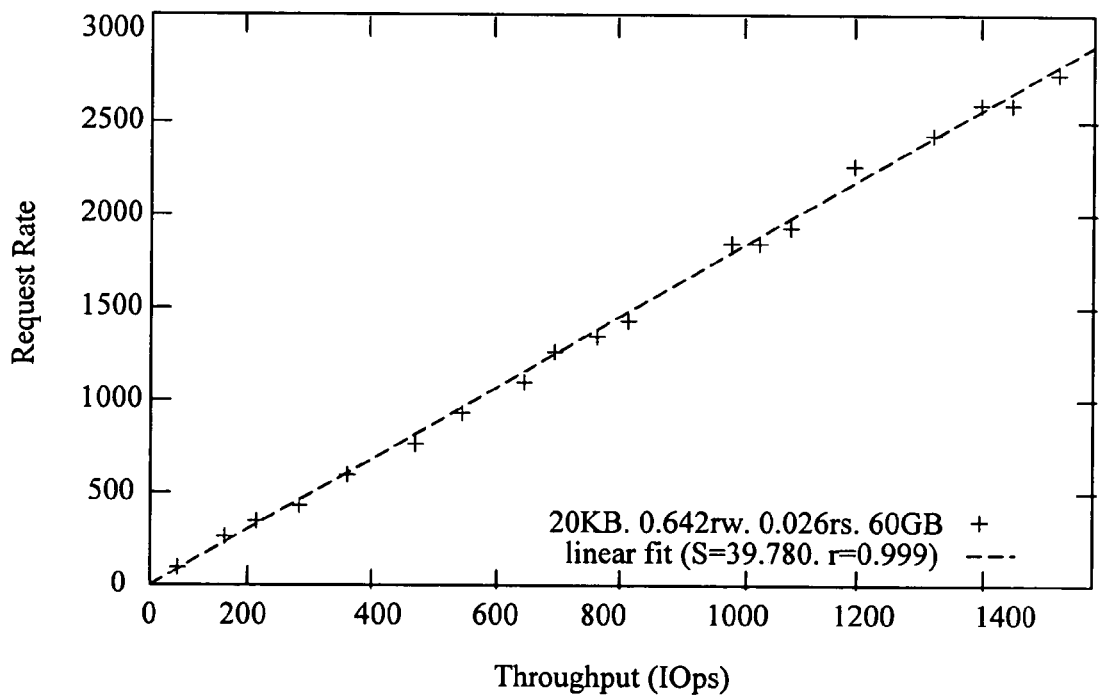

For example, if the workload requests are being served from the cache, throttling this workload will have no change in the request-rate of the storage controller. As shown in FIG. 2, the function R is derived by combining two sets of relationships: the change in the application-level request rate of the workload as a function of the degree of throttling; and the request rate at the component as a function of the application-level request rate of the workload.

First, the change in the application-level request rate of the workload as a function of the degree of throttling is defined as function I. This relationship is dependent on how the throttling mechanism is implemented, which is relatively static w.r.t. to the workload characteristics. This relationship is generated using the calibration toolkit, where the workload is throttled by varying percentage in order to measure to change in the application-level request rate.

Second, the request rate at the component as a function of the application-level request rate of the workload. For example, a workload stream getting 2500 iops at the application-level translates to 1100 packets/sec at the switch, and 900 iops at the disks. This is because of effects such as coalescing of IO requests, and a fraction of the requests are served from the host-cache. This relationship is defined as function T. This relationship is relatively dynamic and changes continuously with the workload characteristics such as request_size, read_write_ratio, etc. The data for this relationship is collected from the running system.

Combining these two sets of relationships I and T yields:

Request_rate$_{component}$=T(I(current_request_rate$_{workload}$, percentage_throttling))

Figure 3:
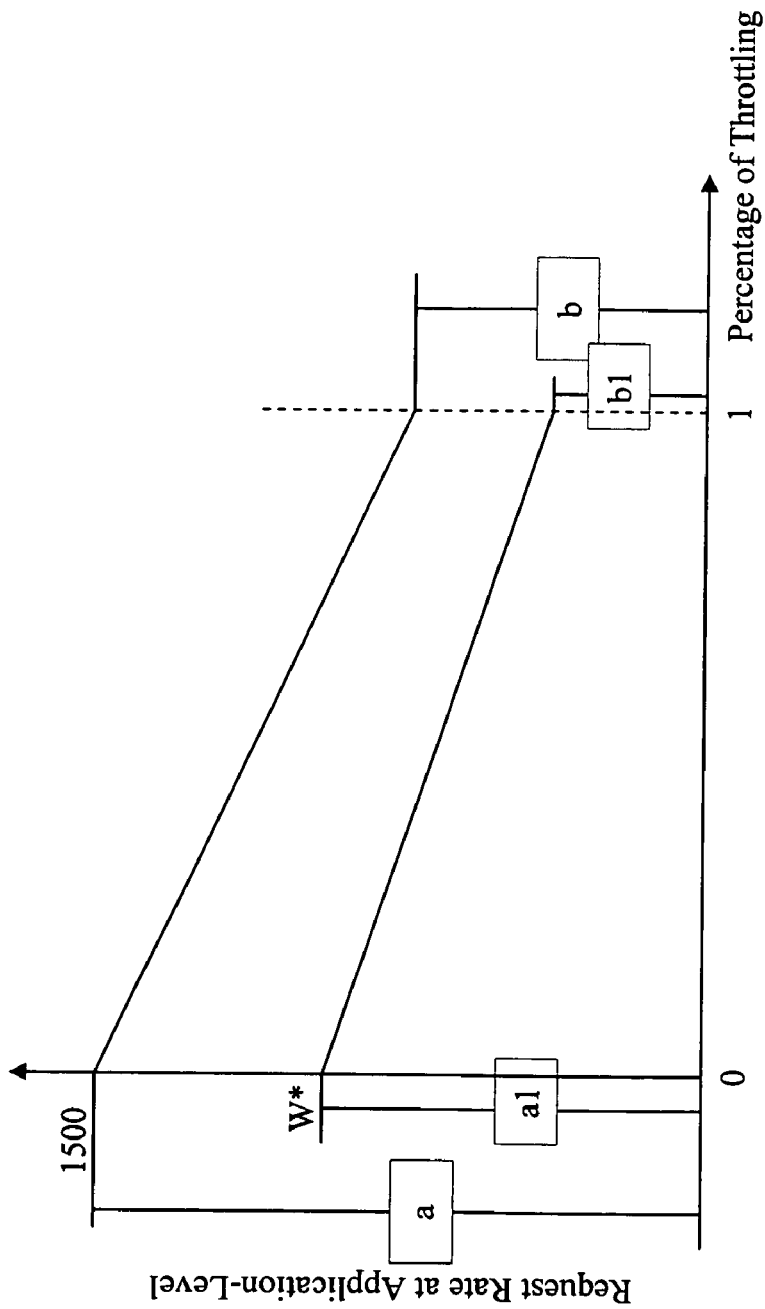
FIG. 3 is a graph illustrating function conversion.

Function I keeps track of the impact of throttling on the application request rate—the function only needs to be learned for one application-level request rate setting; for all other application-level request rate settings, it can derive them from this function. The conversion is based on the assumption that even the application-level request rate changes, the cache-hit ratio of the workload will stay roughly same. Which means, after complete throttling, the request-rate that can be achieved is a fixed portion of the request rate for zero throttling. FIG. 3 shows that if the system knows the function for workload with a 1500 IOps request rate, for workload with a W* IOps request rate, the $$\frac{b_1}{a_1}$$

should stay same as $$\frac{b}{a}.$$

Based on this assumption, the function for W* is:

$$I(t, W^*) = (a_1 - b_1)t$$

$$a_1 = W^*$$

$$b_1 = \frac{b}{a}W^*$$

The Constraint solving engine (i.e., constraint solver 20) is triggered whenever the SLA goals for any of the workloads are violated (victim workloads). On being invoked, the engine determines the components being used by the victim workloads.

Figure 4:
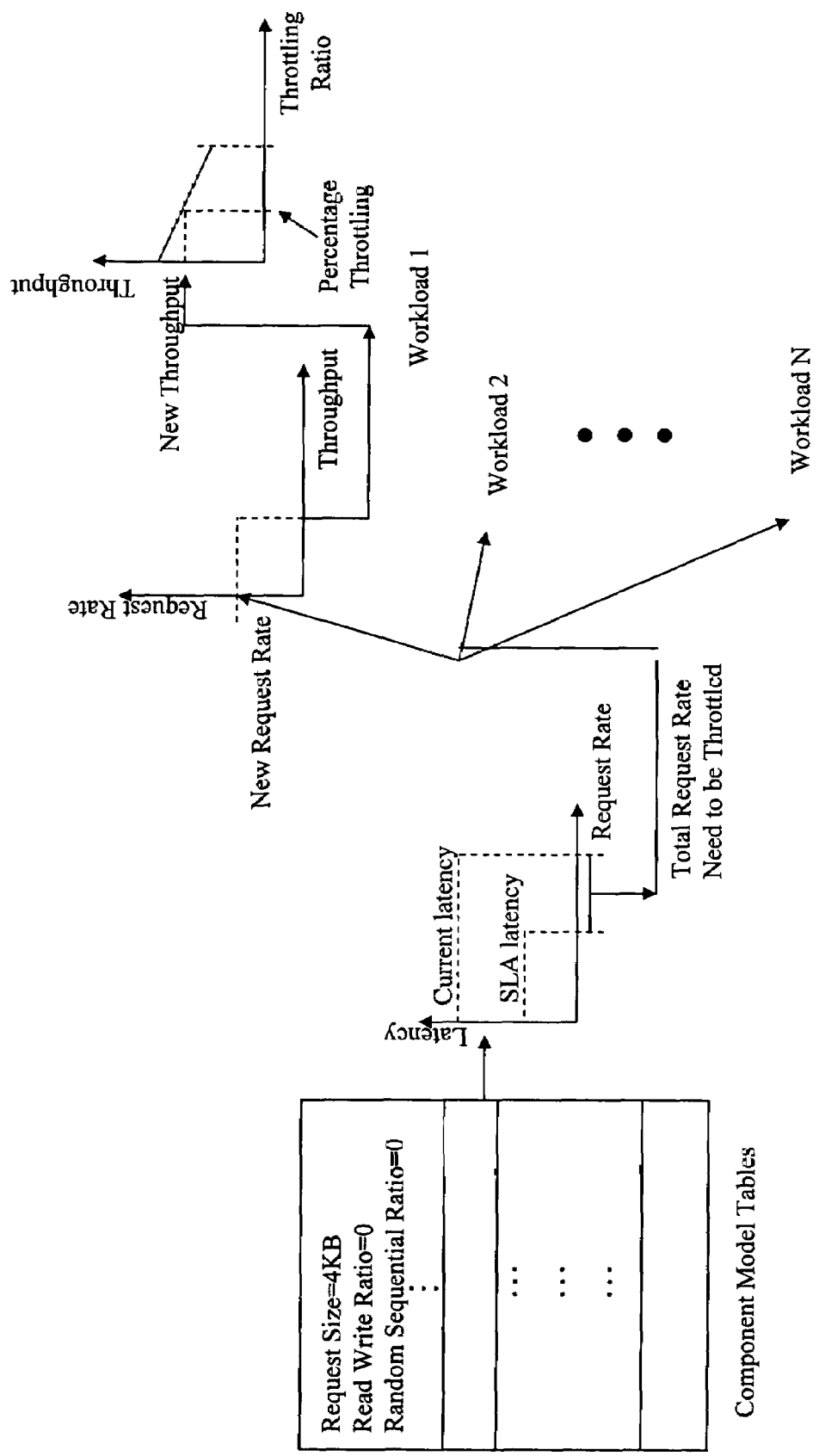
FIG. 4 is a schematic diagram illustrating the intuition of constraint solving.

As shown in FIG. 4, the intuition of constraint solving is follows: first, for each component used by the victim workload, using the component model determine the possible change in component's latency that can be achieved by reducing the request-rate arriving at the component (the change in latency can be with reference to the "knee" of the latency-throughput hockey-stick curve or w.r.t. the normal operating point derived using history). Second, for each workload using these components, analyze its workload model to determine the possible throttling value and the corresponding change in the request-rate at the component. The sum of throttling multiple workloads can help achieve the number of desired change in the request-rate at the component. The workloads selected for throttling are based on additional optimizations based on the priority values of the workloads.

Figure 5:
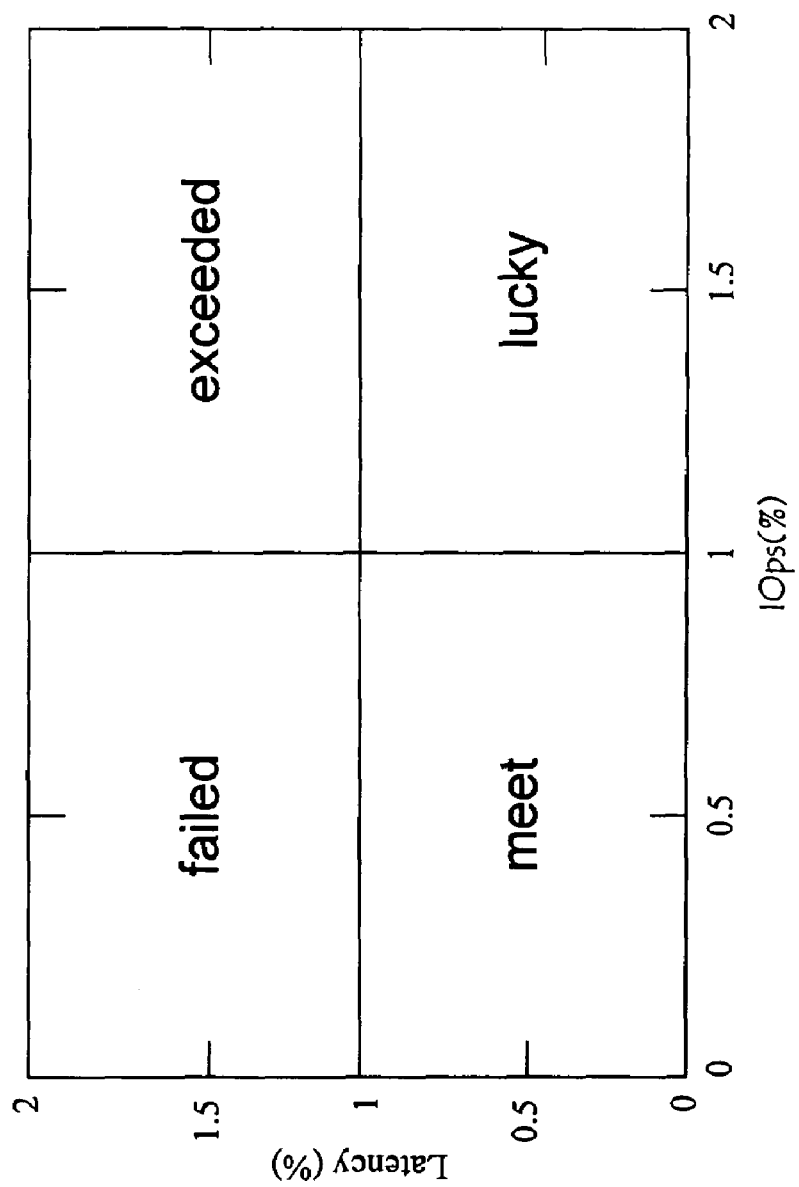
FIG. 5 is a graph illustrating the partition of workload regions.

In addition, the workloads are divided into four regions according to their current status (request rate and latency) and their SLA goal. FIG. 5 shows the partition of regions. The region information will be later on used to assist the reasoning engine.

The constraint solving done by the reasoning engine can be formulated using Linear Programming (LP). Using LP involves defining Variables, objective function, and constraints. More specifically, in regards to variables, $t_1$, $t_2$, $t_3$ represent the throttle values for workloads $W_1$, $W_2$, $W_3$, etc.

Further, there are multiple possible objective functions that can be specified. The general intuition of the objective function is to have maximum number of workloads to meet their SLA goals. As shown in FIG. 5, this objective means that there are no workloads operating in the failed region. The objective function is represented as:

$$\text{minimize} \sum_{i=1}^{workloads} \left| P_{quadrant} P_{Wi} \frac{SLA_{Wi} - I(Wi_{current}, t_i)}{SLA_{Wi}} \right|$$

where $P_{W1}$, $P_{W2}$, etc. are application-level priorities values associated with the workloads, $P_{quadrant}$ represents the probability to be selected as a throttling candidate based on the workload's current quadrant, and $I(Wi_{current}, t_i)$ represents the workload model for Wi. Note that the summation only includes the non-victim workloads. In simple words, this objective function ensures that: the system will first try to throttle low-priority workloads and then the high-priority workloads; and if the workload is in the lucky or exceeded region, they will be given higher probability of being selected for throttling.

In regards to constraints, the idea is to express the information derived from component (C) and workload models (I) as linear inequality equations. Making the workloads to operate in the meet and lucky regions, it to ensure that the latency SLA for the workloads is met, i.e., Current_Latent$_{Wp}$≦SLA$_{Wp}$. This translates to:

$$p_{C1}L_{C1}+p_{C7}L_{C7}+\ldots \leq SLA_{Wp}$$

where Cl, C7, are the components in the invocation path of Wp, Lc$_1$, Lc$_7$ is the resultant_response_time of the components and $P_{C1}$, $P_{C7}$ is the percentage of workloads that goes through component Cl and C7 respectively. In a similar fashion, there is one latency equation for each workload running in the system.

$L_{C1}=C(R_{C1})$ where C is the component function and $R_{C1}$ represents the request-rate at component C1. Further, the request-rate at the component is the summation of the workload streams from the individual components:

$$R_{C1}=R(t_1,W_1)+R(t_2,W_2)\ldots+R(t_n,W_n)$$

where R is the component request rate function described above.

Embodiments of the invention further comprise measuring confidence values of the prediction models. In predicting the value of $y_p=b_0+b_1x_p$, the standard deviation of the predicted value ($S_p$) is represented as:

$$S_p = S\sqrt{1+\frac{1}{n}+\frac{(x_p-\bar{x})^2}{\sum x^2 - n\bar{x}^2}}$$

where S is the standard error, n is the number of points used for regression, and $\bar{x}$ is the mean values of the predictor variables used for regression. Using $S_p$, the step-size used for throttling the workloads is represented as: $c/S_p$ where c is a constant. For example, the reasoning engine determines the throttling values for workload $W_1$ to be 30% and workload $W_2$ to be 50%; assuming $S_p=1$, $c=20$, the step-size used will be 20%, i.e., in each iteration, $W_1$ is throttled by 6%, and $W_2$ by 10%. The throttling executor will stop the incremental throttling when the objective function is met.

In addition to measuring the error in the predicted values, it is possible to get an absolute measure for the "goodness" of regression models. This is achieved by using the standard error S and correlation coefficient r.

First, the standard error estimates the spread of the data points around the regression curve; as the quality of the data model increases, S approaches zero, S is defined as:

$$S = \sqrt{\frac{\sum_{i=1}^{n_{points}}(yi-y)^2}{n_{points}-n_{param}}}$$

where y denotes the value calculated from the regression model, $y_i$ denotes the data points, and $n_{param}$ is the number of parameters in the particular model.

Second, the correlation coefficient r is represented as:

$$r = \sqrt{\frac{S_t - S_r}{S_t}}$$

where $S_t$ is the standard deviation w.r.t the mean of data, while $S_r$ is the standard deviation w.r.t the regression model. $S_t$ and $S_r$ are represented as:

$$S_t = \sum_{i=1}^{n_{points}}(\bar{y}-yi)^2$$

where $\bar{y}$ is the average of the data points.

$$S_r = \sum_{i=1}^{n_{points}}(yi-y)^2$$

For a perfect fit, the standard error of regression will approach $S_r=0$ and the correlation coefficient will approach $r=1$.

Creation of the models is not a one-time activity. The models need to continuously updated to improve S and r of the model (by using additional data points collected from the system) and to account for changes in the characteristics of the function being modeled (especially the workload models). To update the models, linear regression can be invoked to re-calculate the model after every m additional data-points are collected from the system. Alternatively, the model can be updated after every prediction, wherein the difference between the predicted value and the actual value is used as an error-feedback to adjust the coefficient values in the model using re-enforcement based neural networks.

Additionally, embodiments of the invention comprise a feedback-based throttling executor. Predictions based on models are not always completely accurate which lead to either overthrottling or under throttling the system. On the other hand, using a feedback-based approach to throttle the workloads cannot be used for getting the optimized solution. Further the number of permutations that need to be tried in a feedback-based approach can be potentially large and can lead to traversing false paths that may not be acceptable in a running system. As described above, embodiments of the invention combine the feedback-based approach with a model-based predication mechanism. The idea is that the workload throttling values derived by the reasoning engine are not used in a single step, but rather invoked with a step-size that is proportional to the confidence value associated with the models. The confidence value is represented in terms of the standard deviation of the predicted values.

There are different approaches for converging towards the "optimal region" predicted by the prediction models. One approach involves changing the knob-values maintaining the aspect ratio, i.e., if the predicted throttle values are $t_1$, $t_2$, and the corresponding incremental values at any given instant are x, y, then $t_1/t_2=x/y$. Another approach involves effect-based convergence such that the incremental throttling with a greater impact on the victim workloads, is preferred compared to other workloads. In this approach the aspect ratio is not maintained.

Embodiments of the invention present a method and system for automated management using a hybrid of prediction models and feedback-based systems. The method calculates confidence values of models and maintains the confidence values as a weighted moving average based on a history of differences between predicted and observed values of the models. Next, the method selects an action from among a class of models, based on the confidence values. Following this, the selected action is incrementally executed using a feedback-based execution engine, wherein divergent behavior is detected and re-calculation of workload throttling values are triggered.

The feedback-based execution engine is controlled by the workload throttling values and the workload throttling values are applied incrementally to the feedback-based execution engine, during execution of the selected action, with a step-size that is proportional to the confidence values. The execution of the selected action is repeated until an objective function is maximized, wherein the objective function specifies performance goals of the workloads.

Additionally, an alternative action may be selected (based on the confidence values), wherein the alternative action is executed incrementally using the feedback-based execution engine. The feedback-based execution engine is controlled by the workload throttling values and the workload throttling values are applied incrementally to the feedback-based execution engine during the execution of the alternative action. The execution of the alternative action is repeated until the objective function is maximized. The method further comprises refining the models by associating a safety margin to the models, wherein the safety margin is based on the difference between the predicted and observed values of the models.

Figure 6:
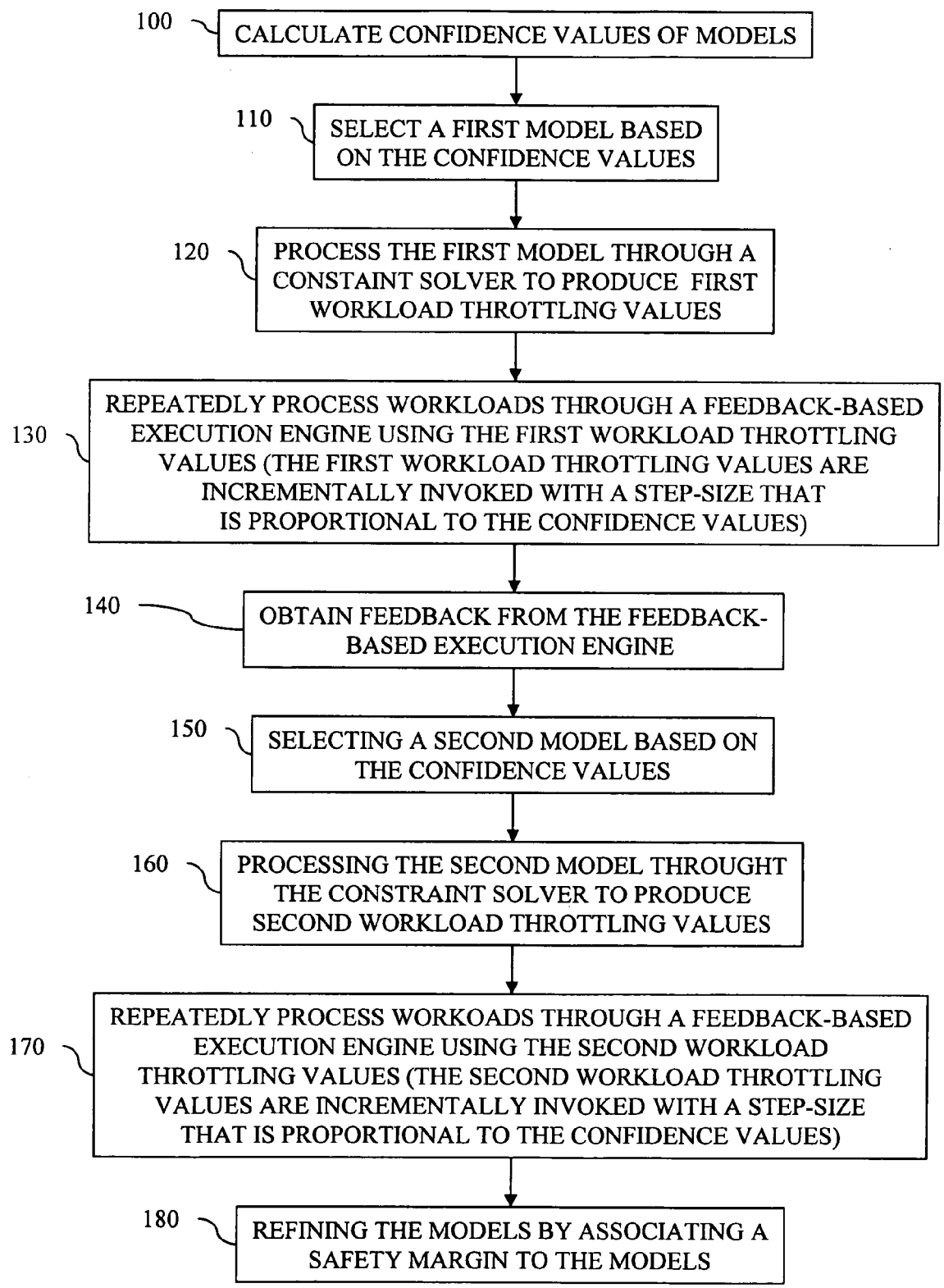
FIG. 6 is a flow diagram of a method of the invention.

FIG. 6 illustrates a flow diagram of a method for automated management using a hybrid of prediction models and feedback-based systems. In item 100, the method begins by calculating confidence values of models. For example, as discussed above, in predicting the value of $y_p = b_0 + b_1 x_p$, the standard deviation of the predicted value ($S_p$) is represented as:

$$S_p = S \sqrt{1 + \frac{1}{n} + \frac{(x_p - \bar{x})^2}{\sum x^2 - n\bar{x}^2}}$$

where S is the standard error, n is the number of points used for regression, and $\bar{x}$ is the mean values of the predictor variables used for regression. Next, the method selects a first model based on the confidence values (item 110) and processes the first model through a constraint solver to produce first workload throttling values (item 120). As discussed above, the intuition of constraint solving is follows (as shown in FIG. 3): first, for each component used by the victim workload, using the component model to determine the possible change in the component's latency that can be achieved by reducing the request-rate arriving at the component. Second, for each workload using these components, analyze its workload model to determine the possible throttling value and the corresponding change in the request-rate at the component.

Subsequently, in item 130, workloads are repeatedly processed through a feedback-based execution engine, wherein the feedback-based execution engine is controlled by the first workload throttling values. The first workload throttling values are applied incrementally to the feedback-based execution engine, during repetitions of the processing of the workloads, with a step-size that is proportional to the confidence values. The processing of the workloads is repeated until an objective function is maximized, wherein the objective function specifies performance goals of the workloads. Furthermore, as discussed above, the objective function ensures that the system will first try to throttle low-priority workloads and then high-priority workloads; and, if the workload is in the lucky or exceeded region, they will be given higher probability of being selected for throttling.

In addition, the method further comprises obtaining feedback from said feedback-based execution engine (item 140) and selecting a second model based on the confidence values (item 150). Next, in item 160, the second model is processed through the constraint solver to produce second workload throttling values. The selection of another model can be conducted at run-time by using a combination of metrics, namely, confidence value, cost of execution, and risk-analysis based on current and predicted system trends. The second workload throttling values are applied incrementally to the feedback-based execution engine, during repetitions of the processing of the workloads, with a step-size that is proportional to the confidence values (item 170). For example, assume that the constraint solver generates throttling values for $W_1 = 40\%$, $W_2 = 30\%$, $W_3 = 0$. Given an incremental step-size of 20%, the feedback-based execution engine will throttle values starting with $W_1 = 8\%$ and $W_2 = 6\%$. The processing of the workloads is repeated until the objective function is maximized.

In item 180, the method further comprises refining the models by associating a safety margin to the models. The safety margin represents the error compensation to the values predicted by the models and is based on the difference between the predicted and observed values of the models. Moreover, the safety margin captures the idea that detecting changes in the system is relatively instantaneous compared to the iterations required to reflect those changes within the knowledge-base. In other words, changing the models is a slow process, and the system needs to account for this fact during the decision-making.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
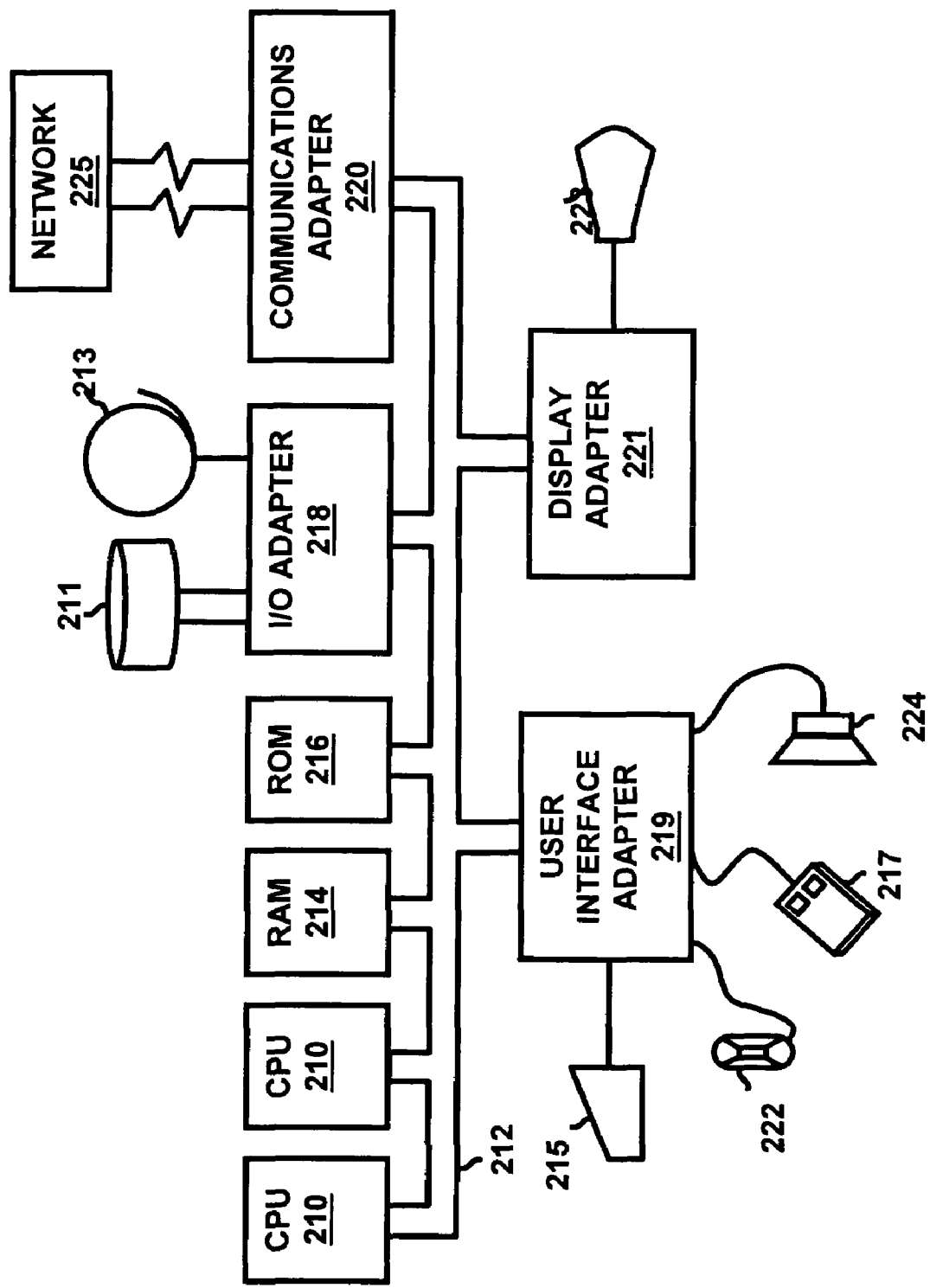
FIG. 7 is a diagram of a computer system of the invention.

A representative hardware environment for practicing the embodiments of the invention is depicted in FIG. 7. This schematic drawing illustrates a hardware configuration of an information handling/computer system in accordance with the embodiments of the invention. The system comprises at least one processor or central processing unit (CPU) 210. The CPUs 210 are interconnected via system bus 212 to various devices such as a random access memory (RAM) 214, read-only memory (ROM) 216, and an input/output (I/O) adapter 218. The I/O adapter 218 can connect to peripheral devices, such as disk units 211 and tape drives 213, or other program storage devices that are readable by the system. The system can read the inventive instructions on the program storage devices and follow these instructions to execute the methodology of the embodiments of the invention. The system further includes a user interface adapter 219 that connects a keyboard 215, mouse 217, speaker 224, microphone 222, and/or other user interface devices such as a touch screen device (not shown) to the bus 212 to gather user input. Additionally, a communication adapter 220 connects the bus 212 to a data processing network 225, and a display adapter 221 connects the bus 212 to a display device 223 which may be embodied as an output device such as a monitor, printer, or transmitter, for example.

Accordingly, embodiments of the invention present a system management paradigm as a hybrid of feedback-based and model-based systems. More specifically, prediction models are used to characterize the system properties, namely the workload characteristics and the component behaviors. At run-time, workloads to be throttled are derived by constraint solving; this involves defining objective functions and constraints. The output of constraint solving is the throttling values for each of the workloads; the accuracy of these values depends on the accuracy of the component and workload models. The confidence values of the prediction models are based on the expected accuracy of the prediction for a given point in the behavior space. Throttling values are not enforced in a single step, but are rather enforced incrementally as a feedback-based system. The step-size for the incremental feedback is proportional to the confidence values associated with the prediction models. It should he noted that the incremental throttle values for each workload are based on those generated by the constraint-solver.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method comprising:
   calculating confidence values of models;
   selecting a selected action from among a class of said models, wherein said selecting is based on said confidence values;
   executing said selected action incrementally using a feedback-based execution engine, wherein said executing said selected action comprises detecting divergent behavior and triggering re-calculation of workload throttling values,
   wherein said feedback-based execution engine is controlled by said workload throttling values and said workload throttling values are applied incrementally to said feedback-based execution engine during said executing of said selected action, and
   wherein said executing of said selected action is repeated until an objective function is maximized, wherein said objective function specifies performance goals of workloads;
   refining said models by calculating a safety margin for said models to create refined models, wherein said safety margin is based on a difference between predicted and observed values of said models; and
   outputting said refined models to a computer display.

2. The method according to claim 1, all the limitations of which are incorporated herein by reference, wherein said workload throttling values are incrementally invoked during said executing of said selected action with a step-size that is proportional to said confidence values.

3. The method according to claim 1, all the limitations of which are incorporated herein by reference, selecting an alternative action from among said class of said models, wherein said selecting is based on said confidence values.

4. The method according to claim 3, all the limitations of which are incorporated herein by reference, further comprising:
   executing said alternative action incrementally using said feedback-based execution engine,
   wherein said feedback-based execution engine is controlled by said workload throttling values and said workload throttling values are applied incrementally to said feedback-based execution engine during said executing of said alternative action, and
   wherein said executing of said alternative action is repeated until said objective function is maximized.

5. The method according to claim 1, all the limitations of which are incorporated herein by reference, further comprising maintaining said confidence values as a weighted moving average based on a history of differences between said predicted and said observed values of said models.

6. A method comprising:
   calculating confidence values of models;
   selecting a first model based on said confidence values;
   processing said first model through a constraint solver to produce first workload throttling values; and
   repeatedly processing workloads through a feedback-based execution engine,
   wherein said feedback-based execution engine is controlled by said first workload throttling values and said first workload throttling values are applied incrementally to said feedback-based execution engine during repetitions of said processing of said workloads,
   wherein said processing of said workloads is repeated until an objective function is maximized, wherein said objective function specifies performance goals of said workloads; and
   outputting said workloads to a computer display.

7. The method according to claim 6, all the limitations of which are incorporated herein by reference, wherein said first workload throttling values are incrementally invoked during said processing of said workloads with a step-size that is proportional to said confidence values.

8. The method according to claim 6, all the limitations of which are incorporated herein by reference, further comprising obtaining feedback from said feedback-based execution engine and selecting a second model based on said confidence values.

9. The method according to claim 8, all the limitations of which are incorporated herein by reference, further comprising:
processing said second model through said constraint solver to produce second workload throttling values; and
repeatedly processing workloads through said feedback-based execution engine,
wherein said feedback-based execution engine is controlled by said second workload throttling values and said second workload throttling values are applied incrementally to said feedback-based execution engine during repetitions of said processing of said workloads,
wherein said second workload throttling values are incrementally invoked during said processing of said workloads with a step-size that is proportional to said confidence values, and
wherein said processing of said workloads is repeated until said objective function is maximized.

10. The method according to claim 6, all the limitations of which are incorporated herein by reference, further comprising refining said models by associating a safety margin to said models, wherein said safety margin is based on a difference between predicted and observed values of said models.

11. A system comprising:
at least one processor connected to a storage device;
one or more models, wherein a first model is selected from said models based on confidence values of said models;
a constraint solver for processing said first model;
first workload throttling values, wherein said first workload throttling values are produced by said processing of said first model through said constraint solver; and
a feedback-based execution engine for repeatedly processing workloads, wherein said feedback-based execution engine is controlled by said first workload throttling values and said first workload throttling values are applied incrementally to said feedback-based execution engine during repetitions of said processing of said workloads,
wherein said feedback-based execution engine detects divergent behavior and trigger re-calculation of workload throttling values,
wherein said processing of said workloads is repeated until an objective function is maximized, wherein said objective function specifies performance goals of said workloads; and
wherein said feedback-based execution engine outputs said workloads to a computer display.

12. The system according to claim 11, all the limitations of which are incorporated herein by reference, wherein said first workload throttling values are incrementally invoked during said processing of said workloads with a step-size that is proportional to said confidence values.

13. The system according to claim 11, all the limitations of which are incorporated herein by reference, further comprising a second model selected from said models based on said confidence values.

14. The system according to claim 13, all the limitations of which are incorporated herein by reference, further comprising second workload throttling values produced by processing said second model through said constraint solver,
wherein said workloads are repeatedly processed by said feedback-based execution engine;
wherein said second workload throttling values control said feedback-based execution engine and said second workload throttling values are applied incrementally to said feedback-based execution engine during repetitions of said processing of said workloads,
and wherein said processing of said workloads is repeated until an objective function is maximized.

15. The system according to claim 11, all the limitations of which are incorporated herein by reference, further comprising a safety margin associated to said models for refining said models, wherein said safety margin is based on the difference between predicted and observed values of said models.

16. A computer storage device comprising a computer usable medium storing a computer readable program, wherein the computer readable program, when executed on a computer, causes the computer to perform a method comprising:
calculating confidence values of models;
selecting a first model based on said confidence values;
processing said first model through a constraint solver to produce first workload throttling values;
repeatedly processing workloads through a feedback-based execution engine,
wherein said feedback-based execution engine is controlled by said first workload throttling values and said first workload throttling values are applied incrementally to said feedback-based execution engine during repetitions of said processing of said workloads,
and wherein said processing of said workloads is repeated until an objective function is maximized, wherein said objective function specifies performance goals of said workloads; and
outputting said workloads to a computer display.

17. The computer storage device according to claim 16, all the limitations of which are incorporated herein by reference, wherein said first workload throttling values are incrementally invoked during said processing of said workloads with a step-size that is proportional to said confidence values.

18. The computer storage device according to claim 16, all the limitations of which are incorporated herein by reference, wherein said repeatedly processing said workloads comprises detecting divergent behavior and triggering re-calculation of workload throttling values by selecting a second model based on said confidence values.

19. The computer storage device according to claim 18, all the limitations of which are incorporated herein by reference, further comprising:
processing said second model through said constraint solver to produce second workload throttling values; and
repeatedly processing workloads through said feedback-based execution engine,
wherein said feedback-based execution engine is controlled by said second workload throttling values and said second workload throttling values are applied incrementally to said feedback-based execution engine during repetitions of said processing of said workloads,
wherein said second workload throttling values are incrementally invoked during said processing of said workloads with a step-size that is proportional to said confidence values, and
wherein said processing of said workloads is repeated until said objective function is maximized.

20. The computer storage device according to claim 16, all the limitations of which are incorporated herein by reference, further comprising refining said models by associating a safety margin to said models, wherein said safety margin is based on the difference between predicted and observed values of said models.

* * * * *